United States Patent
Okamoto et al.

[11] Patent Number: 5,838,301
[45] Date of Patent: *Nov. 17, 1998

[54] STILL PICTURE REPRODUCTION SYSTEM THAT ALLOWS SKIP

[75] Inventors: Hiroshi Okamoto, Hashima; Youji Sugiura, Motosu-gun, both of Japan

[73] Assignee: Sanyo Electric Co., Ltd., Osaka, Japan

[*] Notice: The term of this patent shall not extend beyond the expiration date of Pat. No. 5,604,512.

[21] Appl. No.: 741,034

[22] Filed: Oct. 30, 1996

Related U.S. Application Data

[63] Continuation of Ser. No. 361,850, Dec. 21, 1994, Pat. No. 5,604,512, and a continuation of Ser. No. 66,461, May 24, 1993, abandoned.

[30] Foreign Application Priority Data

May 28, 1992 [JP] Japan ................................. 4-136901

[51] Int. Cl.[6] .................................................. H04N 5/781
[52] U.S. Cl. ........................... 345/146; 386/68; 386/121; 386/123
[58] Field of Search ..................... 345/121, 123, 345/146, 185; 395/164; 386/4, 5, 68, 121, 123; 348/55

[56] References Cited

U.S. PATENT DOCUMENTS

| | | |
|---|---|---|
| 4,717,971 | 1/1988 | Sawyer . |
| 4,849,817 | 7/1989 | Short . |
| 4,964,004 | 10/1990 | Barker . |
| 5,122,886 | 6/1992 | Tanaka . |
| 5,140,425 | 8/1992 | Yamaguchi et al. . |
| 5,157,511 | 10/1992 | Kawai et al. . |
| 5,179,449 | 1/1993 | Doi . |
| 5,198,802 | 3/1993 | Bertram et al. . |
| 5,261,048 | 11/1993 | Matsumoto et al. . |

FOREIGN PATENT DOCUMENTS

| | | |
|---|---|---|
| 2-309882 | 12/1990 | Japan . |
| 3-46073 | 2/1991 | Japan . |

*Primary Examiner*—Amare Mengistu
*Attorney, Agent, or Firm*—Michaelson & Wallace; Peter L. Michaelson; John C. Pokotylo

[57] ABSTRACT

In a still picture reproduction system used for presentation of pictures in museums, a particular still picture can be retrieved rapidly by applying a retroactive reproduction function. When the mode is switched from a normal reproduction mode to a retroactive reproduction mode by a mouse, only the first still picture of a series of still pictures reproduced in the normal reproduction mode is reproduced and displayed on an HDTV. These first still pictures in each of a number of series are selectively and manually switched in sequence.

20 Claims, 9 Drawing Sheets

| EXECUTION NUMBER | PRESENTATION MODE | PICTURE NUMBER | EFFECT COMMAND | PARAMETER |
|---|---|---|---|---|
| 1 | 00 | 0000 | DIS | 04 |
| 2 | $DISP_0$.DAT | | | |
| 3 | $DISP_1$.DAT | | | |
| 4 | 00 | 0007 | CUT | |
| 5 | 00 | 0008 | DIS | 03 |

FIG.6

| EXECUTION NUMBER | LAP TIME | COMMAND | PARAMETER |
|---|---|---|---|
| 01 | 00:00:00 | STR | |
| 02 | 00:00:00 | DRD | 00 0001 N |
| 03 | 00:02:00 | CUT | |
| 04 | 00:02:00 | DRD | 00 0002 N |
| 05 | 00:05:00 | DIS | 02 |
| 06 | 00:05:00 | DRD | 00 0003 N |
| 07 | 00:10:00 | CUT | |
| 08 | 00:15:00 | END | |

STILL PICTURE REPRODUCTION SYSTEM THAT ALLOWS SKIP

CROSS REFERENCE TO RELATED APPLICATION

This application is a continuation of patent application Ser. No. 08/361,850, filed on Dec. 21, 1994, now U.S. Pat. No. 5,604,512 and Ser. No. 08/066,461, filed May 24, 1993, now abandoned, both entitled "Still Picture Reproduction System That Allows Skip Retrieval".

BACKGROUND OF THE INVENTION

1. Field of the Invention

The present invention relates to a still picture reproduction system that allows skip retrieval, and more particularly, to a still picture reproduction system for displaying each of still picture in a plurality of series of such pictures recorded on a recording medium.

2. Description of the Background Art

In art galleries and museums, presentation of artistic works and the like is carried out using a high definition television (HDTV). In this presentation, a still picture reproduction system is used for sequentially displaying a still picture of artistic works according to a predetermined program.

A typical still picture reproduction system includes a microcomputer for controlling the order and time period for displaying a still picture, a magneto-optical disk reproduction apparatus, and an HDTV.

According to a conventional still picture reproduction system, a still picture to be displayed is designated by a predetermined order by a microcomputer, whereby the designated still picture is reproduced from a magneto-optical disk by a magneto-optical disk reproduction apparatus. The reproduced still picture is displayed by the HDTV for a predetermined time period.

Such a presentation is carried out by switching the still pictures automatically or manually the. For example, still pictures having mutual relation are switched automatically, such as in the case where still pictures of a plurality of works painted by a certain painter are presented. In contrast, a still picture on the screen of the monitor is switched manually according to the explanation of the presenter, such as in the case where the presentation changes from the last still picture of a series of still pictures of the works of a certain artist to the first still picture of a series of still pictures of the works of another artist.

It is often necessary to display a particular still picture again after the presentation when all the still pictures forming a plurality of series have been sequentially displayed, or when the presenter wants to display a certain still picture during the presentation to respond to a question from the audience.

In such a case, the already-displayed still pictures had to be displayed one by one again in the opposite order until the desired still picture appears on the screen in a conventional still picture reproduction system, similar to the case of presentation using a slide projector. Therefore, retrieval of a particular still picture was time consuming.

The assignee of the present application has disclosed in Japanese Patent Laying-Open No. 2-309882 a system for displaying a still picture at a timing determined according to position information from an audio reproduction apparatus, and in Japanese Patent Laying-Open No. 3-46073 a system that reduces in size a lengthwise still picture for displaying the entire picture thereof. However, there is no disclosure of a technique for selectively displaying again a particular still picture from a plurality of still pictures already displayed.

SUMMARY OF THE INVENTION

An object of the present invention is to provide a still picture reproduction system that can retrieve a particular still picture rapidly when presentation is carried out using a high definition television or the like.

In accordance with the present invention, a still picture reproduction system for displaying each of still pictures forming a plurality of series recorded on a recording medium includes a still picture designate apparatus, a still picture reproduction apparatus, and a still picture display apparatus.

The still picture designate apparatus designates a plurality of still pictures to be displayed according to a predetermined order, and selects any of a plurality of series of still pictures according to an externally applied request for designating only the first still picture designated in the designation according to the predetermined order to be displayed, out of the still pictures forming the selected series. The still picture reproduction apparatus reproduces a still picture designated by the still picture designate apparatus from the recording medium. The still picture display apparatus displays the still picture reproduced by the still picture reproduction apparatus.

In the above-described still picture reproduction system, the still picture designate apparatus designates a still picture at an order opposite to the designated order in the designation according to a predetermined order when designation of a still picture is carried out according to an externally applied request.

Also, in the above-described still picture reproduction system, the still picture designate apparatus designates a still picture at an order identical to the designated order in the designation according to a predetermined order when designation of a still picture is carried out according to an externally applied request.

According to another aspect of the present invention, a still picture reproduction system includes the above-described still picture designate apparatus, the above-described still picture reproduction apparatus, a memory, and a still picture display apparatus.

The memory stores a still picture reproduced by the still picture reproduction apparatus. The still picture display apparatus displays a still picture stored in the memory.

According to a further aspect of the present invention, a still picture reproduction system includes a still picture designate apparatus, the above-described still picture reproduction apparatus, a plurality of memories, a still picture select circuit, and a still picture display apparatus.

The still picture designate apparatus specifies a plurality of still pictures to be displayed according to a predetermined order, and selects any of a plurality of series of still pictures according to an externally applied request for designating only the first still picture designated in the designation according to a predetermined order to be displayed, out of the still pictures forming the selected series. The still picture designate apparatus instructs the still picture select circuit to select and read out a still picture according to a predetermined order and at a predetermined timing when still picture designation is carried out according to the predetermined order, and every time according to an externally applied request. Each still picture reproduced by the still picture reproduction apparatus is sequentially stored in the memory. The still picture select circuit selects and reads out any of the still pictures stored in the plurality of memories. The still picture display apparatus displays a still picture read out by the still picture select circuit.

The main advantage of the present invention is to allow retrieval of a particular still picture rapidly because only the first still picture in each series is selectively reproduced and displayed according to an externally applied request after all still pictures are reproduced according to a predetermined order or during reproduction of a still picture.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of a still picture reproduction system according to the present invention will be described hereinafter with reference to the drawings.

Figure 2:
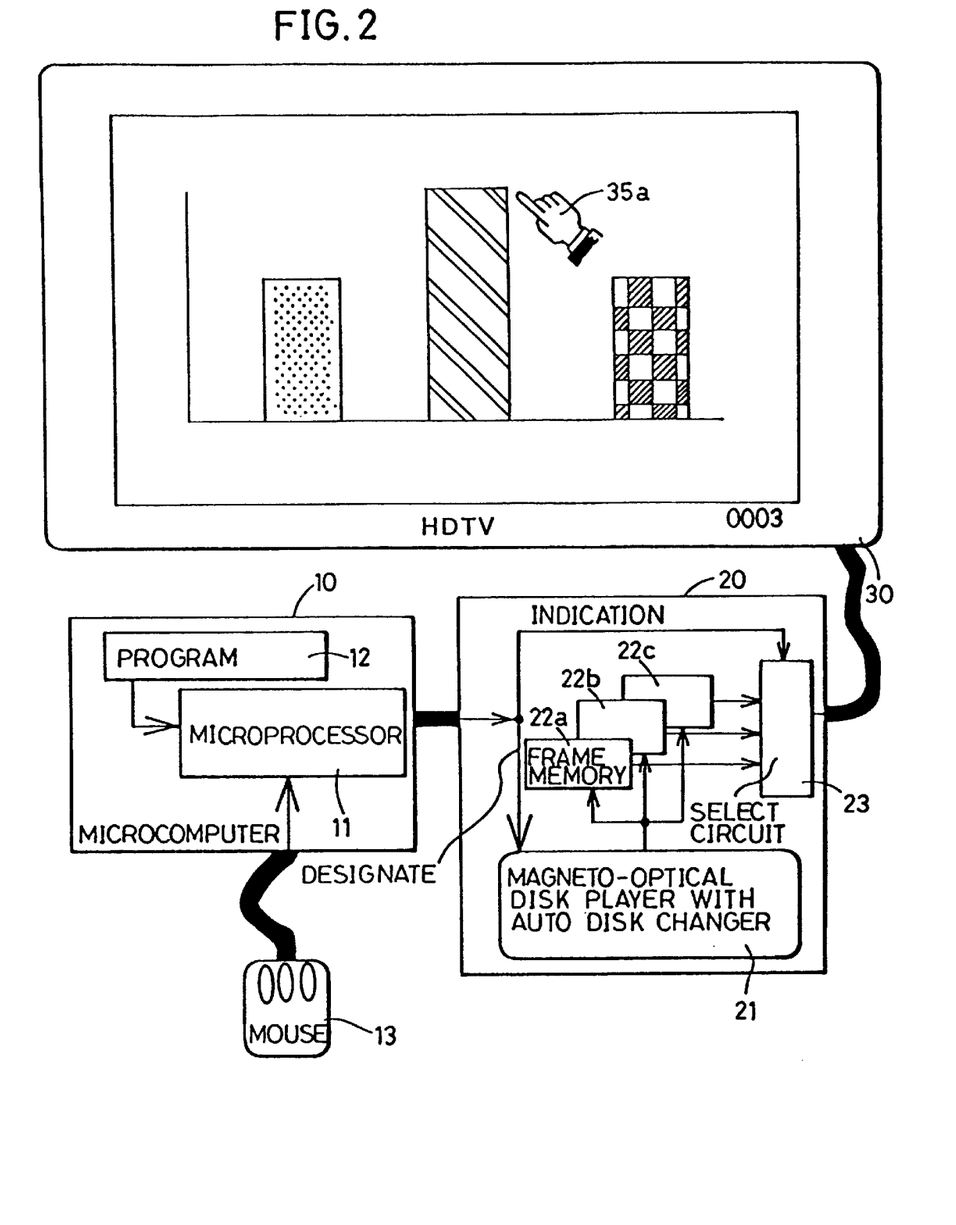
FIG. 2 is a block diagram showing a structure of a still picture reproduction system according to the present invention.

FIG. 2 is a block diagram showing a structure of a still picture reproduction system according to the present invention.

Referring to FIG. 2, a still picture reproduction system includes a microcomputer 10 functioning as a still picture designate apparatus, a main body apparatus 20 functioning as a still picture reproduction apparatus, and a high definition television (HDTV) 30 functioning as a still picture display apparatus.

Microcomputer 10 includes a microprocessor 11, a program 12, and a mouse 13. Microcomputer 10 operates in a normal reproduction mode or a retroactive reproduction mode.

Main body apparatus 20 includes a magneto-optical disk player 21 with an automatic disk changer, three frame memories 22a, 22b, and 22c, and a frame memory select circuit 23. Main body apparatus 20 reproduces a still picture designated by microcomputer 10 from a magneto-optical disk to provide the same to HDTV 30 at a timing instructed by microcomputer 10.

The operation of the still picture reproduction system will be described hereinafter.

Figure 1:
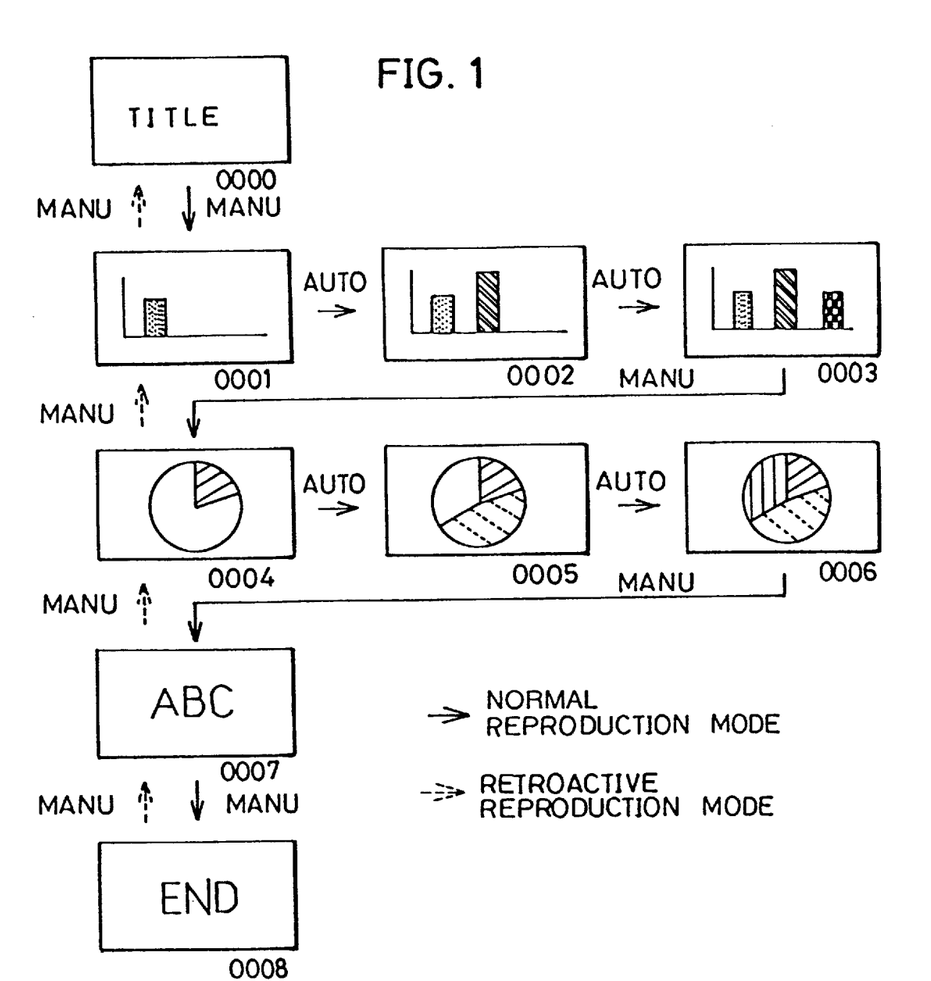
FIG. 1 shows the manner of display of still pictures according to a still picture reproduction system of the present invention.

FIG. 1 shows the order of still pictures displayed on HDTV 30 when presentation is carried out by the still picture reproduction system. Still pictures that are switched automatically to be displayed are arranged in the horizontal direction and those switched manually to be displayed are arranged in the vertical direction in the drawing.

In normal reproduction mode, still pictures are displayed in the order starting from 0000 to 0008. Still pictures 0001–0003 and still pictures 0004–0006 respectively form correspondin seperate series. Still pictures 0001–0003 show bar graphs, for example, and still pictures 0004–0006 show pie charts, for example. Still pictures forming each series have mutual relation with each other.

The plurality of still pictures of one series are switched automatically. More specifically, switching between still picture 0001 and 0002, still picture 0002 and 0003, still picture 0004 and 0005, and still picture 00005 and 0006 is carried out automatically.

Switching between different series and other still pictures is carried out manually. More specifically, switching between still pictures 0000 and 0001, still picture 0003 and 0004, still picture 0006 and 0007, and still picture 0007 and 0008 is carried out manually.

Following such a presentation of still pictures, it is assumed that there was a question from the audience and the need arises for a particular picture (specific number unknown) to be displayed again. In this case, the still picture reproduction system is changed to a retroactive reproduction mode.

In the retroactive reproduction mode, only the first still picture forming each series is displayed at an order opposite to the displayed order of the normal reproduction mode. More specifically, the still pictures are displayed in a retroactive order of 0008→0007→0004→0001→0000. In retroactive reproduction mode, the still pictures are switched manually.

If a desired still picture to be displayed is, for example, 0002, the still pictures are switched manually in the order of 0008→0007→0004→0001. Because the still picture 0001 has visual mutual relation with 0002, still picture 0002 can be recognized as belonging to the series of still picture 0001. Thus, it is possible to retrieve a particular still picture rapidly in comparison with the case where all the still pictures are displayed in an order opposite to the former displayed order in the normal reproduction mode.

The above operation will be described in details with reference to the structure of the still picture reproduction system.

Prior to the presentation using this still picture reproduction system, a magneto-optical disk having still pictures to be displayed and recorded thereon is mounted to a magneto-optical disk player 21. Program 12 for presentation including data such as the display order and display time period of still pictures is loaded in microcomputer 10.

Figure 3:
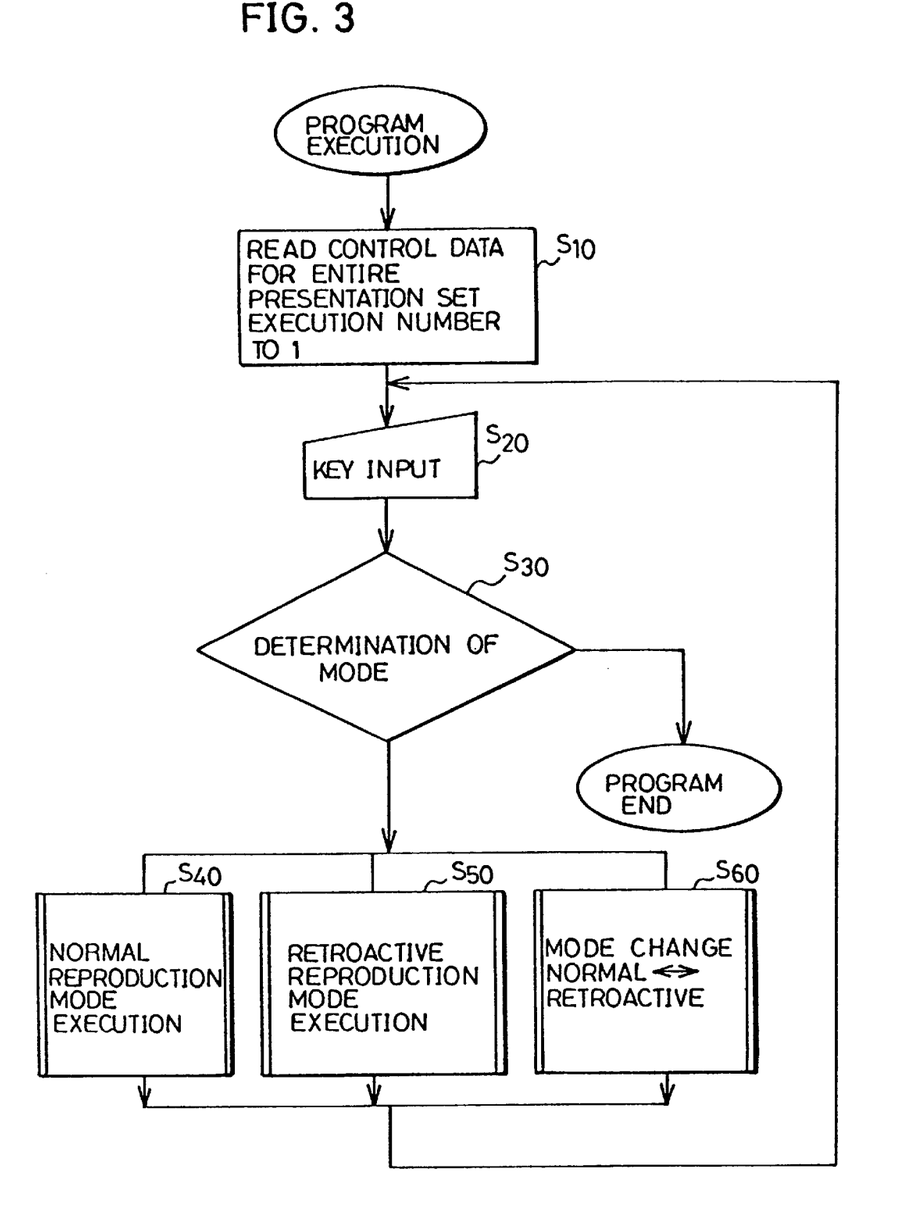
FIG. 3 is a flow chart for describing the operation of the still picture reproduction system shown in FIG. 2.
Figure 4:
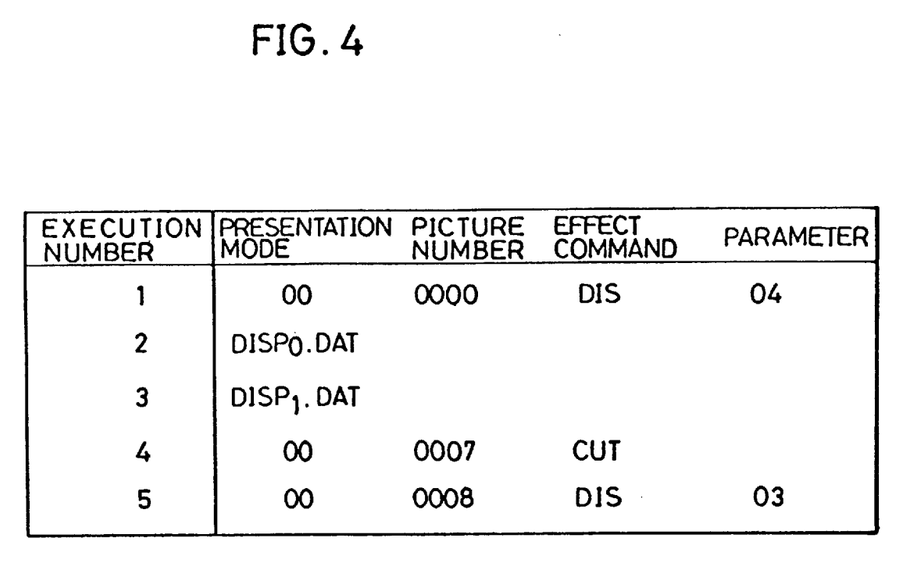
FIG. 4 shows an example of control data for operating the still picture reproduction system shown in FIG. 2.

Referring to the flow chart of FIG. 3, execution of program 12 causes the control data for the entire presentation shown in FIG. 4 to be read into microprocessor 11, and the execution number is set to "1" at step S10. The system is initially set to a normal reproduction mode.

Control data for the entire presentation includes execution number, presentation mode (disk number), picture number, effect command (dissolve, cut), and parameter, as shown FIG. 4. The presentation mode includes automatic presentation mode and manual presentation mode.

When one button is pressed on mouse 13 at step S20, the current mode is identified at step S30. Because a normal reproduction mode is specified here, a normal reproduction mode is executed at step S40.

Figure 5:
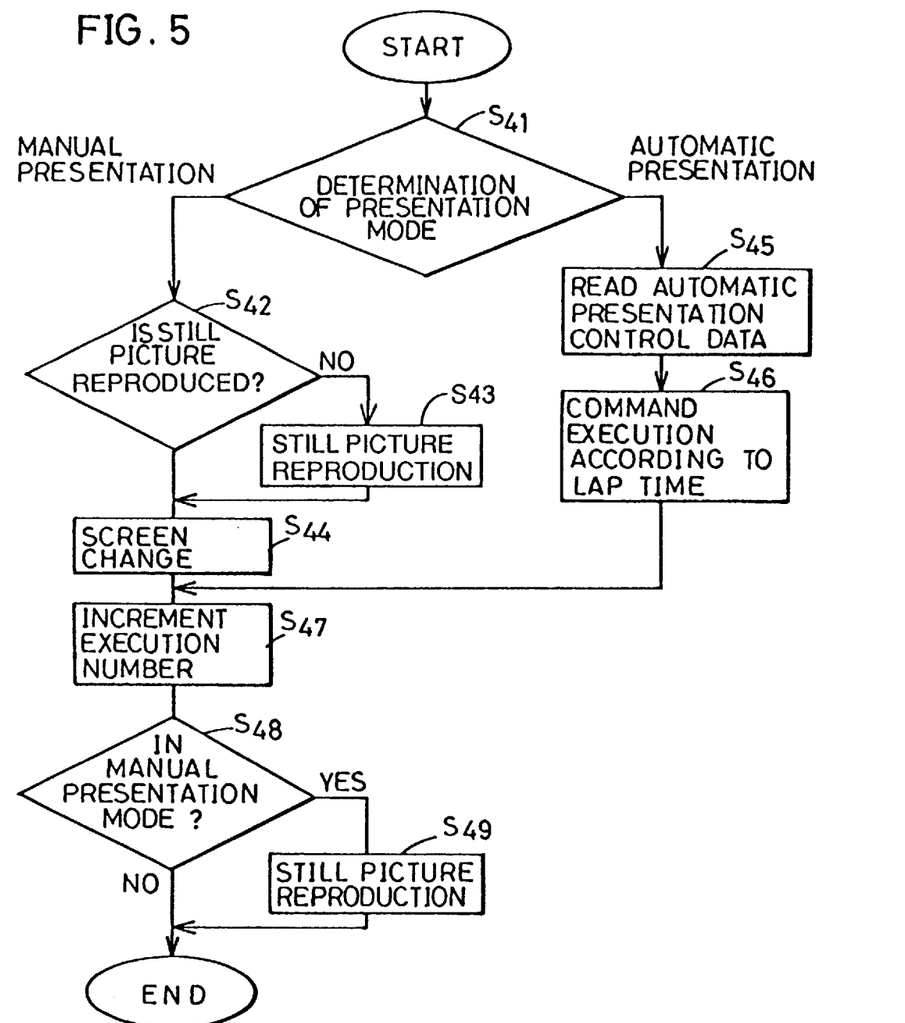
FIG. 5 is a flow chart for describing the operation of the still picture reproduction system shown in FIG. 2 in normal reproduction mode.

When a normal reproduction mode is executed, the presentation mode is determined at step S41 in the flow chart of FIG. 5. Because the execution number is "1" and the presentation mode is "00" representing a disk number, manual presentation is carried out.

At step S42, determination is made whether a still picture to be displayed is reproduced by magneto-optical disk player 21, and whether it is stored in frame memory 22a, 22b or 22c. Because the still picture is not reproduced and not stored in frame memory 22a, 22b, or 22c, a magneto-optical disk of disk number "00" is loaded into the magneto-optical disk player 21 by the automatic disk changer at step S43, whereby a still picture 0000 on magneto-optical disk 00 is reproduced by magneto-optical disk player 21 and stored in the first frame memory 22a. Because the effect command is "DIS" and the parameter is "04", the screen on high vision monitor 30 is switched, through step S44, in a dissolve manner over 4 seconds to result in the display of still picture 0000.

The switching manner of the screen such as dissolve and the display timing on the screen are controlled by select circuit 23 which is controlled by microcomputer 10.

At step S47, the execution number is incremented. At step S48, determination is made whether the mode is manual presentation mode or not. Because the current mode is automatic presentation mode at this time, this normal reproduction mode is terminated.

Referring to the flow chart of FIG. 3 again, when one button on mouse 13 is pressed at step S20, determination of the current mode is made at step S30. Then, a normal reproduction mode is executed again at step S40.

Referring to the flow chart of FIG. 5, determination of the presentation mode is made at step S41. Because the execution number is "2" and the presentation mode is "DISP0.DAT", automatic presentation is carried out.

Figure 6:
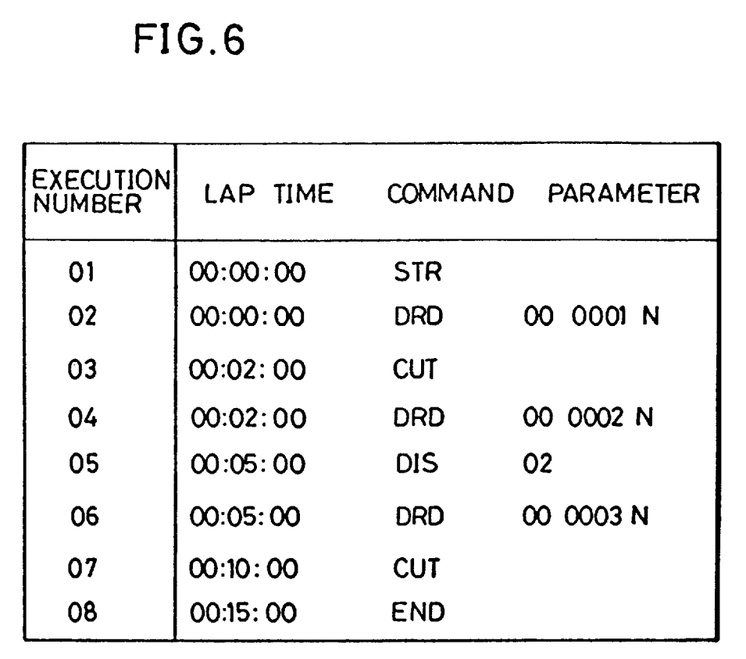
FIG. 6 shows a table of control data for automatic display required for operation in the normal reproduction mode shown in FIG. 5.

At step S45, control data (DISP0.DAT) for automatic presentation mode shown in FIG. 6 is read in. The control data includes execution number, lap time, command and parameter.

At step S46, each command is executed according to a lap time. Command "STR" indicates initiation of automatic presentation. Command "DRD" indicates reproduction and storage of a particular still picture. Command "CUT" indicates switching of a screen in a cut manner. Command "DIS" indicates switching a screen in a dissolve manner. Command "end" indicates termination of automatic presentation.

At execution number 01, automatic presentation starts at the lap time of 00 min.:00.00 sec.

Simultaneously at execution number 02, a designate signal representing still picture 0001 on an optical disk of disk number 00 is provided from microcomputer 10 to magneto-optical disk player 21. According to this designate signal, the optical disk of disk number 00 is loaded into player 21 by the auto disk changer, whereby still picture 0001 on that optical disk is reproduced by player 21 to be stored in the second frame memory 22b.

At execution number 03, when the lap time is 00 min.:02.00 sec., a predetermined indicating signal is provided from microcomputer 10 to select circuit 23, whereby still picture 0001 stored in second frame memory 22b is read out and displayed on HDTV 30. Because an indicating signal representing switching of the screen in a cut manner is provided from microcomputer 10 to select circuit 23, the screen on HDTV 30 is instantly switched from still picture 0000 to still picture 0001.

Simultaneously at execution number 04, still picture 0002 on the optical disk of disk number 00 is reproduced by player 21 to be stored in third frame memory 22c.

At execution number 05 when the lap time is 00 min.:05.00 sec., still picture 0002 stored in third frame memory 22c is read out by select circuit 23 to be displayed on HDTV 30. Here, the screen on HDTV 30 is switched from still picture 0001 to still 0002 in a dissolve manner over 2 seconds.

Simultaneously at execution number 06, still picture 0003 on the optical disk of disk number 00 is reproduced by player 21 to be stored in first frame memory 22a.

At execution number 07 when the lap time is 00 min.:10.00 sec., still picture 0003 stored in first frame memory 22a is read out by select circuit 23 to be displayed on HDTV 30. The screen on HDTV 30 is switched in a cut manner.

At execution number 08 when the lap time is 00 min.:15.00 sec., this automatic presentation is terminated.

Then, at step S47, the control data for the entire presentation has the execution number incremented, as described above. At step S48, determination is made whether the mode is in automatic presentation mode. Because the execution number is "3" and in an automatic presentation mode, the normal reproduction mode is terminated without carrying out step S49.

When one button of mouse 13 is depressed at step S20 again, determination is made of the current mode at step S30. At step S40, a normal reproduction mode is executed.

Similarly, at step S41, determination is made of the current presentation mode. At step S45, control data for automatic presentation (DISP1.DAT) is read into microprocessor 11. Similar to the above described control data (DISP0.DAT), this control data (DISP1.DAT) specifies the still picture to be displayed 0004–0006, lap time, and switching manner of the screen. Because the contents of control data (DISP1.DAT) are similar to those of the above described control data (DISP0.DAT), their details will not be repeated.

At step S46, each command is executed according to the lap time in the control data (DISP1.DAT), and still pictures 0004–0006 are sequentially displayed on HDTV 30 at a predetermined timing.

At step S47, the execution number in the control data for presentation is incremented. At step S48, determination is made whether the mode is manual presentation mode.

Because the execution number is now "4" and in manual presentation mode, still picture 0007 on the optical disk of disk number 00 is reproduced by player 21 to be stored in second frame memory 22b at step S49. Here, the normal reproduction mode is terminated.

When one button on mouse 13. is depressed at step S20, determination is made of the current mode at step S30. At step S40, the normal reproduction mode is executed.

At step S41, determination is made whether the presentation mode is a manual presentation mode or an automatic presentation mode. Because the mode is now in manual presentation mode, determination is made whether the still picture to be displayed is reproduced or not at step S42. Because still picture 0007 to be displayed is already reproduced here, the screen on HTDV 30 is switched from still picture 0006 to 0007 at step S44.

At step S47, the execution number is incremented. The system proceeds to step S49 via step S48 to reproduce the next still picture to be displayed 0008. The reproduced still picture 0008 is stored in third frame memory 22c.

When one button in mouse 13 is depressed at step S20, the system proceeds to step S40 via step S30 to execute a normal reproduction mode.

At step S44 via steps S41 and S42, the screen on HDTV 30 is switched from still picture 0007 to still picture 0008.

By completing all the above-described steps, the presentation is ended.

When the need arises for a particular still picture to be displayed according to a question from the audience, the other button on mouse 13 is depressed at step S20 to make determination of the current mode at step S30. At step S60, the mode change is carried out. Here the mode is changed from a normal reproduction mode to a retroactive reproduction mode.

When the one button of mouse 13 is depressed at step S20, determination is made of the current mode at step S30, and a retroactive reproduction mode is executed at step S50.

Figure 7:
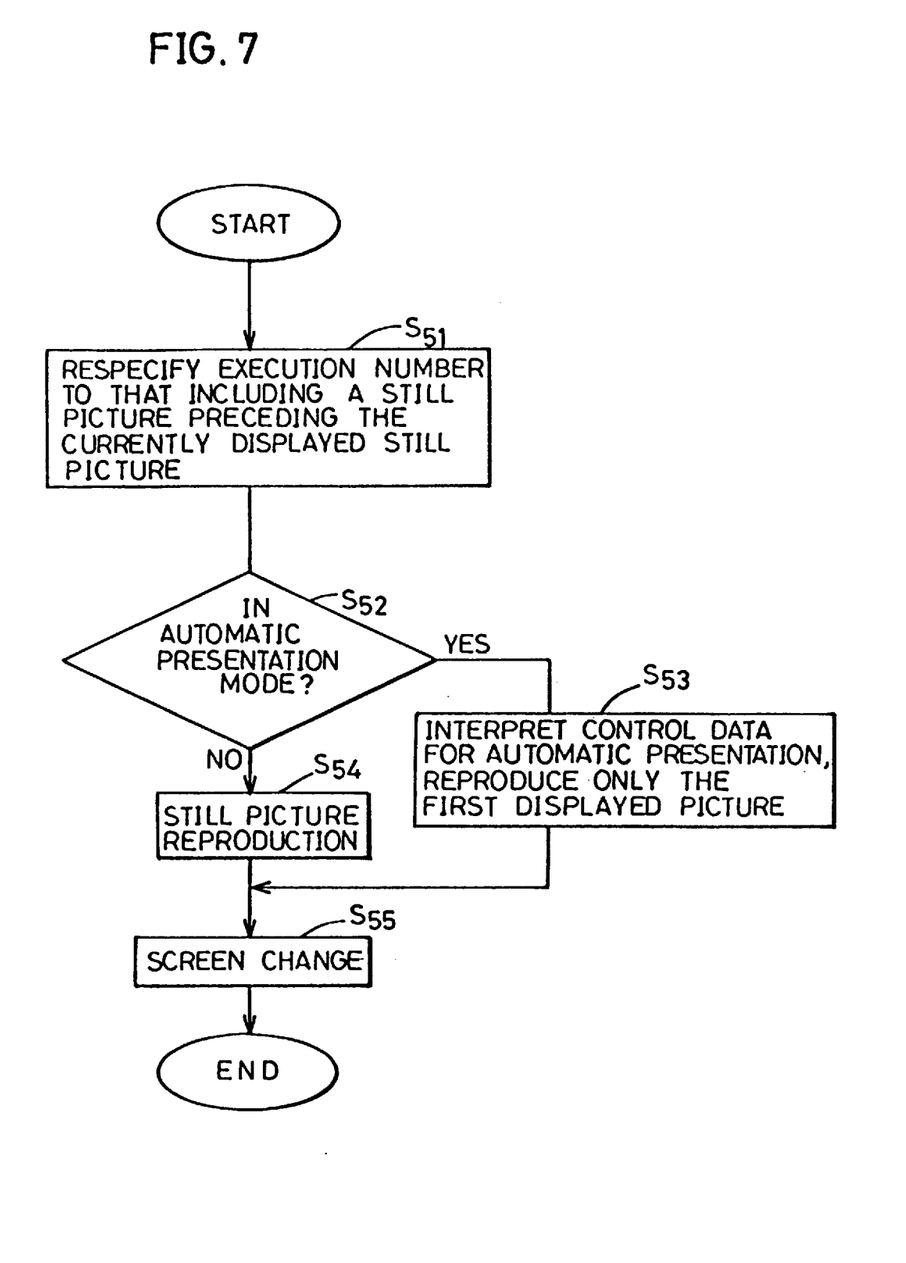
FIG. 7 is a flow chart for describing the operation of the still picture reproduction system shown in FIG. 2 in a retroactive reproduction mode.

FIG. 7 is a flow chart indicating each step in a retroactive reproduction mode.

At step S51, the execution number is respecified to that including a still picture preceding the currently displayed still picture. Because the currently displayed still picture is 0008, the execution number is respecified to "4" including the preceding still picture 0007.

At step S52, determination is made whether in automatic presentation mode or not. Because the system is currently in manual presentation mode, still picture 0007 is reproduced by player 21 to be stored in first frame memory 22a at step S54.

At step S55, still picture 0007 stored in first frame memory 22a is read out by select circuit 23 to be displayed on HDTV 30. That is to say, the screen on HDTV 30 is switched from still picture 0008 to still picture 0007.

When the other button on mouse 13 is pressed again at step S20, determination of the current mode is made at step S30, and a retroactive presentation mode is executed at step S50.

At step S51, the execution number is respecified to that including a still picture preceding the currently displayed still picture. More specifically, the execution number is respecified to "3" including still picture 0006 preceding the currently displayed still picture 0007.

At step S52, determination is made whether the mode is in automatic presentation mode. Because the current mode is automatic presentation mode, the control data (DISP1.DAT) for automatic presentation is interpreted at step S53, whereby only the first still picture 0004 to be displayed of a series of still pictures is reproduced and stored in second frame memory 22b.

At step S55, still picture 0004 stored in frame memory 22b is read out, whereby the screen on HDTV 30 is switched from still picture 0007 to still picture 0004.

Determination is made by the person in the audience giving the relevant question or by the presenter whether the particular still picture to be displayed belongs to the series of the currently displayed still picture 0004 on HDTV monitor 30. If determination is made that a desired still picture to be displayed does not belong to the series of the currently displayed still picture, the one button on mouse 13 is depressed again at step S20 to make determination of the current mode at step S30. At step S50, a retroactive reproduction mode is executed.

Similarly, at step S51, the execution number is respecified to "2", and determination is made whether the current mode is automatic presentation mode or not at step S52. Because the current mode is automatic presentation mode, the control data (DISP0.DAT) for automatic presentation is interpreted at step S53, whereby the first still picture 0001 to be displayed of the series of still pictures is reproduced to be stored in third frame memory 22c.

At step S55, still picture 0001 stored in frame memory 22c is read out, whereby the screen on HDTV 30 is switched from still picture 0004 to still picture 0001.

Here again, determination is made whether the particular still picture desired to be displayed belongs to the series of the currently displayed still picture. If determination is made that the particular still picture to be displayed belongs to the series of the currently displayed still picture, the screen on HDTV 30 is switched by a manual mode (not shown) from still picture 0001 to 0002, and then from still picture 0002 to still picture 0003.

Because a particular still picture is displayed by the above-described steps, a still picture desired to be displayed can be retrieved rapidly.

Although the above embodiment is described in the case of retrieving a particular still picture after a presentation is completed, it is also possible to retrieve a particular still picture during presentation.

For example, it is assumed that the above-described first automatic presentation is ended, and a still picture 0003 is displayed on HDTV 30 as shown in FIG. 2. A cursor 35a is displayed on this screen indicating that the current mode is a normal reproduction mode.

Figure 8:
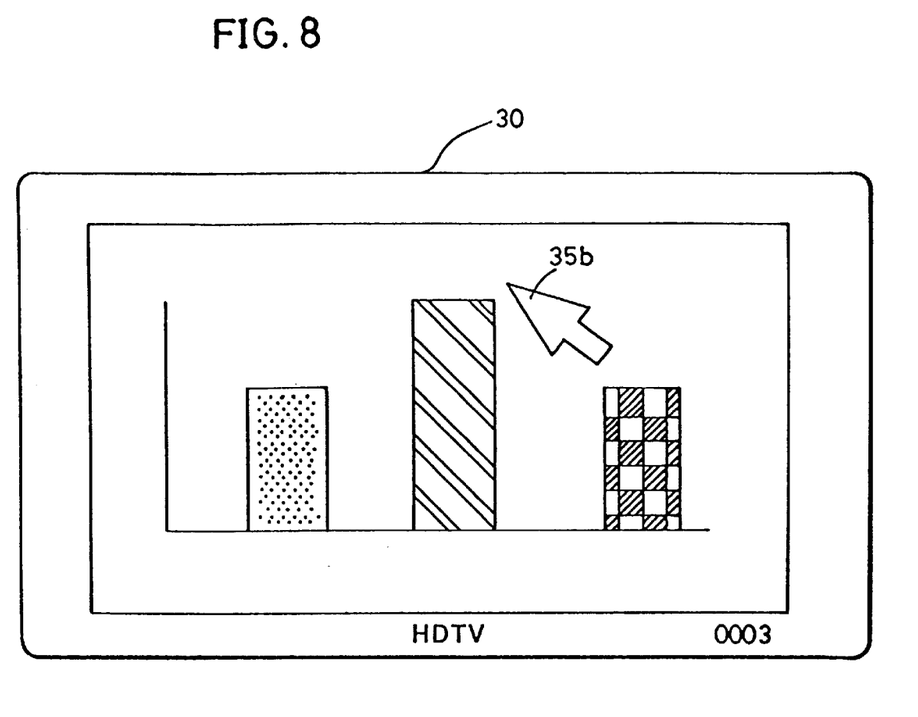
FIG. 8 shows an example of a still picture displayed in the retroactive reproduction mode shown in FIG. 7.

Here, when the other button on mouse 13 is depressed at step S20, determination is made of the current mode at step S30. At step S60, mode change is carried out. Here, the mode is changed from a normal reproduction mode to a retroactive reproduction mode. Referring to FIG. 8, a cursor 35b is displayed on HDTV 30 indicating that the current mode is a retroactive reproduction mode.

When the one button on mouse 13 is depressed at step S20, determination is made of the current mode at step S30, and a retroactive reproduction mode is executed at step S50.

At step S51, the execution number is respecified to "1" including a still picture 0000 preceding the currently displayed still picture 0001.

Figure 9:
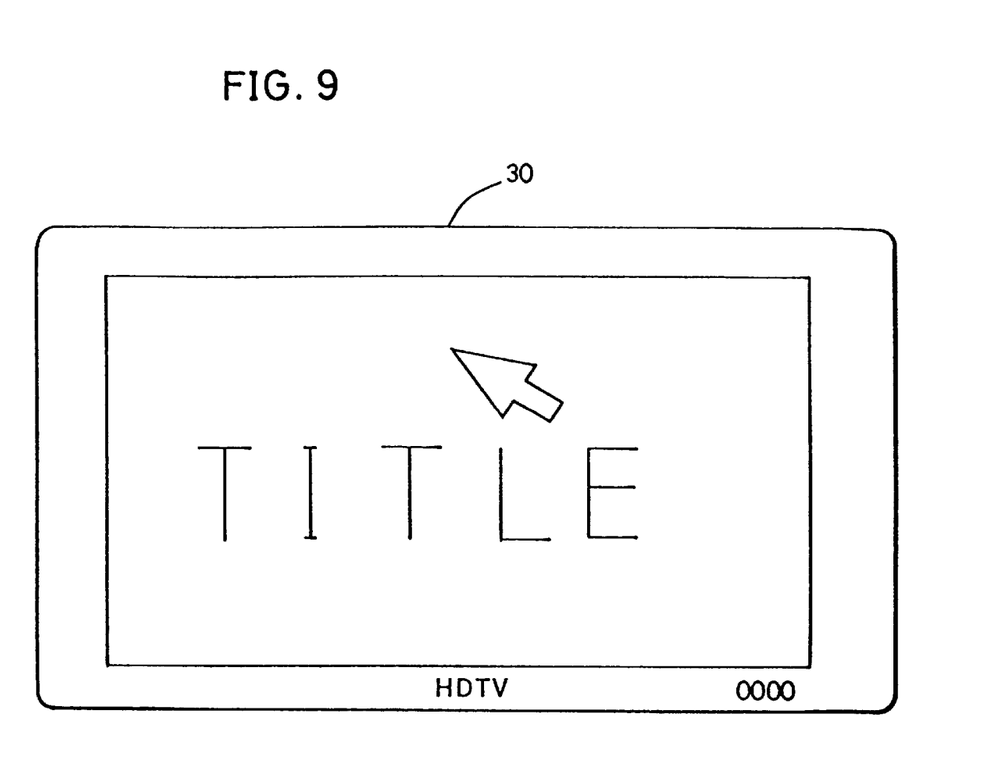
FIG. 9 shows another example of a still picture displayed in the retroactive reproduction mode shown in FIG. 7.

At step S52, determination is made whether the current mode is automatic presentation mode or not. Because the current mode is manual presentation mode, still picture 0000 is reproduced at step S54, whereby the screen on HDTV 30 is switched from still picture 0003 to still picture 0000 as shown in FIG. 9.

Although the above embodiment is described where only the first still picture belonging to each series is reproduced at an order opposite to the order reproduced by a normal reproduction mode, the system may be implemented so as to reproduce still pictures in the same order.

For example, when a still picture 0004 is displayed on HDTV 30 in a retroactive reproduction mode and stored in second frame memory 22b, it is preferable to store the first still pictures 0001 and 0007 belonging to a preceding and a succeeding series in first and third frame memories 22a and 22c, respectively. This is because a still picture 0001 or 0007 can be displayed rapidly by depressing the one button of mouse 13 under this state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still picture reproduction system for displaying a plurality of still pictures recorded on a recording medium, said system comprising:

an order designator for designating an order in which said still pictures are to be displayed so as to form a predetermined picture order and for organizing said pictures into a plurality of separate series of pictures in which each one of said series contains a different pre-defined ordered set of said pictures, thereby forming a succession of adjacent series;

a selector having
   a series selection mode in which the selector, in response to an external request, selects one of said plurality of series adjacent to a current one of said plurality of series wherein only one still picture in said one adjacent series is chosen to produce a single designated picture, and
   a picture selection mode in which the selector selects a next successive one of the still pictures in said one series as the designated picture;

a reproducer for reproducing the designated picture from said recording medium so as to generate a reproduced picture; and a display, responsive to said reproducing means, for displaying the reproduced picture.

2. The still picture reproduction system according to claim 1, wherein the chosen one still picture occupies a beginning position in said selected one series.

3. The still picture reproduction system according to claim 1, wherein the series selection mode of the selecting means selects each successive one of said series such that the still pictures chosen for all of said selected series occur at an order opposite to the order of said chosen pictures in said predetermined picture order.

4. The still picture reproduction system according to claim 1, wherein the series selection mode of the selecting means selects each successive one of said series such that the still pictures chosen for all of said selected series occur at an order identical to the order of said chosen pictures in said predetermined picture order.

5. The system of claim 1 wherein, in the picture selection mode, the selector can successively select each one of the still pictures in said one series as the designated picture.

6. A still picture reproduction system for displaying a plurality of still pictures recorded on a recording medium, said system comprising:

an order designator for designating an order in which said still pictures are to be displayed so as to form a predetermined picture order and for organizing said pictures into a plurality of separate series of pictures in which each one of said series contains a different pre-defined ordered set of said pictures, thereby forming a succession of adjacent series;

a selector having
   a series selection mode in which the selector, in response to an external request, selects one of said plurality of series adjacent to a current one of said plurality of series wherein only one still picture in said one adjacent series is chosen to produce a single designated picture, and
   a picture selection mode in which the selector selects a next successive one of the still pictures in said one series as the designated picture;

a reproducer for reproducing the designated picture from said recording medium so as to generate a reproduced picture;

a memory for storing the reproduced picture so as to form a stored picture; and a display for displaying the stored picture.

7. The still picture reproduction system according to claim 6 wherein the chosen one still picture occupies a beginning position in said selected one series.

8. The still picture reproduction system according to claim 6, wherein the series selection mode of the selecting means selects each successive one of said series such that the still pictures chosen for all of said selected series occur at an order opposite to the order of said chosen pictures in said predetermined picture order.

9. The still picture reproduction system according to claim 6, wherein the series selection mode of the selecting means selects each successive one of said series such that the still pictures chosen for all of said selected series occur at an order identical to the order of said chosen pictures in said predetermined picture order.

10. A still picture reproduction system for displaying a plurality of still pictures recorded on a recording medium, said system comprising:

means for designating an order in which said still pictures are to be displayed so as to form a predetermined picture order and for organizing said pictures into a plurality of separate series of pictures in which each one of said series contains a different pre-defined ordered set of said pictures, thereby forming a succession of adjacent series;

selecting means having a series selection mode in which the selecting means, in response to an external request, selects one of said plurality of series adjacent to a current one of said plurality of series wherein only one still picture in said one adjacent series is chosen to produce a single designated picture;

means for reproducing the designated picture from said recording medium so as to generate a reproduced picture; and means, responsive to said reproducing means, for displaying the reproduced picture.

11. The still picture reproduction system according to claim 10 wherein the selecting means includes a picture selection mode for selecting a next successive one of the still pictures in said one series as the designated picture.

12. The still picture reproduction system of claim 10 wherein the predetermined picture order includes a succession of execution numbers, each of the execution numbers having an associated presentation mode, wherein each presentation mode is selected from a group consisting of manual and automatic.

13. The system of claim 10 wherein, in the picture selection mode, the selector can successively select each one of the still pictures in said one series as the designated picture.

14. A still picture reproduction system for displaying a plurality of still pictures recorded on a recording medium, said system comprising:

means for designating an order in which said still pictures are to be displayed so as to form a predetermined picture order and for organizing said pictures into a plurality of separate series of pictures in which each one of said series contains a different pre-defined ordered set of said pictures, thereby forming a succession of adjacent series;

selecting means having a series selection mode in which the selecting means, in response to an external request, selects one of said plurality of series adjacent to a current one of said plurality of series wherein only one still picture in said one adjacent series is chosen to produce a single designated picture;

means for reproducing the designated picture from said recording medium so as to generate a reproduced picture;

means for storing the reproduced picture so as to form a stored picture; and means for displaying the stored picture.

15. The still picture reproduction system according to claim 14 wherein the selecting means includes a picture selection mode for selecting a next successive one of the still pictures in said one series as the designated picture.

16. The still picture reproduction system of claim 15 wherein execution numbers having an associated automatic presentation mode include control data for an automatic presentation.

17. The still picture reproduction system of claim 16 wherein the control data for the automatic presentation includes a series of timed commands, the series of timed commands including a command to reproduce and store a particular still picture and a command to switch screens from the display of a current still picture to the display of the particular still picture stored.

18. The still picture reproduction system of claim 17 wherein the command to reproduce and store a particular still picture includes a parameter including an optical disk number and a still image number related to the particular still picture.

19. The still picture reproduction system of claim 15 wherein execution numbers having an associated manual presentation mode further include an associated picture number, an effect command, and a display time.

20. The still picture reproduction system of claim 19 wherein each effect command is selected from a group consisting of a timed dissolve or a cut.

* * * * *

UNITED STATES PATENT AND TRADEMARK OFFICE
CERTIFICATE OF CORRECTION

PATENT NO. : 5,838,301
DATED : November 17, 1998
INVENTOR(S) : Hiroshi Okamoto, et. al.

It is certified that error appears in the above-identified patent and that said Letters Patent is hereby corrected as shown below:

Title page, item [54] and col. 1, lines 1 and 2, change the title to read -- STILL PICTURE REPRODUCTION SYSTEM THAT ALLOWS SKIP RETRIEVAL--.

Signed and Sealed this

Ninth Day of March, 1999

Attest:

Q. TODD DICKINSON

Attesting Officer

Acting Commissioner of Patents and Trademarks